United States Patent [19]

Donati et al.

[11] Patent Number: 4,877,465
[45] Date of Patent: Oct. 31, 1989

[54] STRUCTURAL PARTS OF AUSTENITIC NICKEL-CHROMIUM-IRON ALLOY

[75] Inventors: Jean R. Donati, Thomery; Daniele Guttmann, Samois sur Seine; Yves Rouillon, Avon; Pierre S. Paul, Samois sur Seine; Guy Zacharie, Fontainebleau, all of France

[73] Assignee: Electicite de France (Service National), France

[21] Appl. No.: 26,514

[22] Filed: Mar. 17, 1987

[30] Foreign Application Priority Data

Mar. 18, 1986 [FR] France ................................ 86 03832

[51] Int. Cl.$^4$ .......................... C22C 19/05; C22F 1/10
[52] U.S. Cl. .................................... 148/428; 148/427; 376/906
[58] Field of Search ........................ 420/452, 453, 454; 376/906; 148/427, 428

[56] References Cited

U.S. PATENT DOCUMENTS

| | | | |
|---|---|---|---|
| 1,983,415 | 12/1934 | Strosacker et al. | 420/452 |
| 2,445,951 | 7/1948 | Kihlgren et al. | 420/452 |
| 2,798,827 | 7/1957 | Hanink | 148/428 |
| 2,858,208 | 10/1958 | Spooner | 420/452 |
| 3,223,818 | 12/1965 | Chyle | 420/452 |
| 4,761,190 | 8/1988 | Smith | 148/427 |
| 4,788,036 | 11/1988 | Eiselstein et al. | 148/428 |

FOREIGN PATENT DOCUMENTS

| | | | |
|---|---|---|---|
| 109350 | 5/1984 | European Pat. Off. | 420/452 |
| 2032811 | 1/1972 | Fed. Rep. of Germany | 420/452 |
| 3407305 | 8/1985 | Fed. Rep. of Germany . | |
| 26222 | 3/1978 | Japan | 420/452 |
| 125251 | 9/1980 | Japan | 420/452 |
| 153763 | 9/1983 | Japan | 420/452 |
| 41456 | 3/1984 | Japan | 420/452 |
| 56555 | 4/1984 | Japan | 420/452 |
| 75543 | 4/1985 | Japan | 420/452 |
| 61-153252 | 7/1986 | Japan . | |
| 61-210145 | 9/1986 | Japan . | |
| 61-288041 | 12/1986 | Japan . | |
| 286367 | 3/1928 | United Kingdom | 420/452 |

Primary Examiner—John J. Zimmerman
Attorney, Agent, or Firm—Fleit, Jacobson, Cohn, Price, Holman & Stern

[57] ABSTRACT

A structural part for use in high temperature aqueous medium consists of an austenitic nickel-chromium-iron alloy containing by wt. 5 to 10% of iron, 18 to 20% of chromium and more than 60% of nickel. All components of the alloy, but chromium, may be in the standard ranges of well-known and proven alloys, typically 600 and X750 alloy.

8 Claims, No Drawings

STRUCTURAL PARTS OF AUSTENITIC NICKEL-CHROMIUM-IRON ALLOY

BACKGROUND OF THE DISCLOSURE

1. Technical Field

The invention relates to structural parts of nickel-chromium-iron base alloy having an austenitic texture, suitable for use in contact with an aqueous medium, at high temperature, typically of 200° to 300° C.

2. Prior Art

Austenitic iron-chrome-nickel alloys have been used for long in high temperature water, in particular for constructing structural members in contact with water and steam in the primary and secondary circuits of pressurized light water reactors (PWRs).

For some of these alloys, extended experience of their use is available and their properties are well known. In particular, the so called "600" alloys have been used for constructing the tubes of the steam generators of PWRs. Such tubes are in contact on one surface with the dimineralized water in liquid and vapor phase of the secondary circuit and, on the other surface, with the water which may contain lithium and boron of the primary circuit. The X750 alloys have also been very widely used for constructing the pins fixing the control cluster guide tubes to the upper core plate, which tubes belong to the upper internals of the reactors.

Table I below gives the composition of these alloys.

TABLE I

|  | C | S | P | Mn | Si | Ni | Cr | Fe | Co | Ti | Cu | Al | Nb |
|---|---|---|---|---|---|---|---|---|---|---|---|---|---|
| 600 | <0.050 | ≦0.015 | ≦0.015 | <1.00 | <0.50 | >72.00 | 14.00–17.00 | 6.00–10.00 | <0.10 | — | <0.50 | — | — |
| 690 | 0.010–0.040 | ≦0.015 | ≦0.015 | ≦0.50 | ≦0.50 | ≧58.00 | 28.00–31.00 | 7.00–10.00 | <0.10 | ≦0.50 | ≦0.50 | ≦0.50 | |
| X 750 | ≦0.080 | ≦0.010 | — | ≦1.00 | ≦0.50 | ≧70.00 | 14.00–17.00 | 5.00–9.00 | ≦0.20 | 2.25–2.75 | ≦0.50 | 0.40–1.00 | 0.70–1.20 |

Through experience, techniques of constructing and welding these alloys have been perfected brushing away the uncertainties and knowledge has been acquired about their long term resistance. But it has becoma apparent that structural members of 600 and X650 alloys exhibit stress corrosion in pure water and in the primary coolant of light water reactors when they are subjected to high mechanical stresses. This phenomenon is one of those which limit the useful life of the structure members formed from these materials which are subjected to stresses in reactors.

Alloys have also been proposed, with the purpose of reducing the generalized corrosion, having a much lower nickel content than that of the above alloys and a much higher chromium content. Among these alloys may be mentioned more especially the 690 alloys, whose composition is also given in table 1, which contain 28 to 31% of chromium and whose nickel content may be as low as 58%.

These new materials have mechanical and physical properties appreciably different from the alloys already widely used; they require new methods of construction compatible therewith which remain to be developed; they give rise to undertainties in so far as their long term resistance is concerned.

SUMMARY OF THE INVENTION

It is an object of the invention to provide structure members of alloys which have essentially the physical and mechanical properties of widely used alloys, but having a resistance to corrosion under stress in pure water and in the primary medium of pressurized water reactors which is substantially greater than that of the fully proven alloys, even when the latter have undergone the heat treatment which gives them the best possible resistance to corrosion under stress.

For that, the invention starts from the finding by the inventors that iron-chromium steels containing nickel and nickel-chromium alloys containing iron become practically insensitive to corrosion under stress in pure water, dilute basic media and primary coolant of light water reactors when they contain more than 18% of chromium. While observations have been made of corrosion of steels with 18% chromium and 10% nickel, they seem due to the fact that these steels were sensitized, that is to say that their chromium content at the grain joints was appreciably less than 18%.

The invention consequently provides a structural part of austenitic stainless chromium-base alloy containing, by weight, 5 to 10% of iron, 18% to 20% of chrome and more than 70% of nickel, the sum of the iron, chrome and nickel contents representing less than 100%.

Since the iron and nickel content of the alloys constituting the structural part remains in the standard ranges of well known and proven alloys, and since the contents of additional elements present in a minor amount may also be selected within the same limits, most metallurgical properties are hardly modified. On the other hand, the increase of the chromium content, although small as compared with that which changes a 600 alloy into a 690 alloy, very considerably improves resistance to corrosion under stress in aqueous medium.

It is particular advantageous to select alloys, depending on the envisaged application thereof, having compositions which differ from those of the 600 and X750 alloys by the increase of the Cr content only, all other components being present in proportions which remain within the standard ranges for these alloys.

When the part is to be used in contact both with the primary coolant of a pressurized water reactor and the demineralized water of the secondary circuit of such a reactor, in liquid and steam phases (in a steam generator for instance), a derivative of the 600 alloys will advantageously be used containing more than 6% of iron. Then, the elements present in substantial proportion in the alloy, in addition to chromium, nickel and iron, are carbon, silicon, titanium, manganese and aluminium. The cumulative sulphur and phosphorous content is less than 0.03% wt.

In the case where the alloy is used for forming structural parts which in operation are in contact with high temperature water likely to contain oxygen, the chromium content is preferably 18.5% at least so that the chromium content at the grain joints remains of about 18% at least and sensitization is avoided.

In practice, in most cases it is preferable to limit the Cr content to an upper value of 19.5%; often a Cr content of 19% wt. will be close to optimum for that use.

Such alloys of this type are similar, in so far as their general physical and chemical characteristics are concerned, to the 600 alloys but have very much increased resistance to corrosion under stress.

For forming structural members subjected to high stresses in a high temperature aqueous medium, such as the primary coolant of a pressurized water reactor, it is advantageous to use an alloy derived from the X750 alloys containing, (in addition to nickel, chromium and iron) significant amounts of manganese, titanium, aluminium and niobium.

The presence of aluminium, niobium and especially titanium in a proportion of 2.25 to 2.75% wt. appreciably increase the resilient stress limit of a structural member subjected to a heat treatment at a temperature which may vary within wide limits.

The sulphur and phosphorous contents must remain very small, of the order of 1 ppm. The titanium, aluminium and niobium proportions will advantageously be within those provided for the X750 alloys, so as to cause very little change in the metallurgical properties and the long term mechanical resistance.

Some examples of alloys for constituting parts in accordance with the invention will now be given, derived from the 600 and X750 alloys; these alloys will be designated by 600A, 600B and X750A. Their compositions are given in the following table II.

TABLE II

|  | C | S | P | Si | Mn | Ni | Cr | Fe | Co | Ti | Cu | Al | Nb |
|---|---|---|---|---|---|---|---|---|---|---|---|---|---|
| 600 A | 0.021 | 0.006 | 0.006 | 0.31 | 0.74 | 72.24 | 19.13 | 7.28 | 0.07 | 0.22 | 0.01 | 0.18 | — |
| 600 B | 0.038 | 0.001 | 0.009 | 0.26 | 0.77 | 72.04 | 19.23 | 7.14 | — | 0.23 | — | 0.13 | — |
| X 750 A | 0.064 | 0.003 | 0.004 | 0.32 | 0.21 | 70.42 | 18.78 | 6.06 | <0.01 | 2.53 | <0.005 | 0.69 | 0.90 |

These alloys were subjected to heat treatment, then to comparative tests which gave the following results.

EXAMPLE 1

Alloy 600A

Several test pieces of the "saddle" type were prepared from the same casting by forming tubes of 22 mm in diameter and 1.27 mm in thickness, cutting up the tubes and shaping. They were subjected to a final heat treatment consisting in passing them through an oven at 980° C. (treatment 1) or at 1010° C. (treatment 2).

The comparison was made with untreated 600 alloy test pieces and test pieces heat treated at 700° C.

The corrosion under stress was compared in two media:

Medium 1: water containing 2 ppm Li as LiOH, 1000 ppm B as H3B03 and 25 ml TPN (normal pressure and temperature) of hydrogen, at 360° C.;

Medium 2: water containing 2 ppm Li as LiOH, 1000 ppm B as H3BO3 and 3 bars of hydrogen at 360° C.

If not thermally treated, the 600 alloy exhibits cracks in media 1 and 2 in less than 3000 hours, in most cases after less than 1000 hours; the 600 alloys, if heat treated at 700° C., often cracked at less than 4000 hours.

On the contrary, the 600 A alloy gave the following results:

Medium 1: No corrosion with treatment 1 after 3100 hours and with treatment 2 after 2100 hours;

Medium 2: No corrosion with treatment 1 after 8700 hours and with treatment 2 after 4100 hours.

EXAMPLE 2

Alloy X750 A

Since it is an alloy for structural parts subjected to mechanical stresses, as pins, nuts and bolts, the test pieces used were cylindrical tensile test pieces subjected to the following heat treatment:

homogenization lasting 24 h at 885° C., hardening by successive steps: 730° C. for 8 h, +620° C. for 8 h.

The comparative tests, under a mechanical stress of 900 MPa, were carried out in pure water containing 25 to 50 ml TPN of hydrogen at 350° C.

Under these conditions, alloy X750 previously processed at 885° C. and then subjected to a hardening treatment in steps cracked in less than 140 hours; the same alloy treated at 1093° C. for an hour, then subjected to hardening at 704° C. lasting 20 hours (which is the treatment currently recommended, cracked in less than 830 hours.

On the other hand, after 500 hours, the alloy X750A, after the heat hardening treatment which confers on the conventional X750 alloy the worst resistance to corrosion among those previously used industrially, did not crack.

In summary, the invention provides alloys for structural parts which have a composition very close to those of well known and proven alloys, but resist cracking when they are subjected to very high mechanical stresses, at high temperature, in chemical media such as water, the primary and secondary aqueous media of nuclear reactors, and diluted basic media.

Among other applications, there may be mentioned the pins for fixing control cluster guide tubes, steam generator tubes and more generally apparatus subjected to mechanical tension stresses requiring the use of nickel-base alloys and operating in a high temperature aqueous media, typically of from 220° C. to 360° C.

What is claimed is:

1. Structural part for use in contact with high temperature high pressure water in a nuclear reactor, of stainless austenitic nickel base alloy containing, by weight, from 5 to 10% of iron, from 18 to 20% of chromium and more than 60% of nickel, the total amount of iron, chromium and nickel representing less than 100% of the alloy, wherein said alloy has been subjected to a homogenization and hardening heat treatment recommended for X750 alloys comprising homogenization at 1093° C. for one hour and subsequent hardening at 704° C. for 20 hours; and wherein said alloy has a yield limit of at least 700 MPa and the contents of all constituents of the alloy, except chromium, are in the standard ranges corresponding to X750 alloys.

2. Structural part according to claim 1, wherein the chromium amount is lower than 19.5% wt.

3. Structural part according to claim 2, wherein the chromium content is about 19% wt.

4. Structural part according to claim 1, for use in contact with high temperature oxygen containing water, wherein the chromium content is at least 18.5% wt.

5. Structural part for use in contact with both the primary coolant of the pressurized water reactor and the demineralized water in liquid and steam phase, of the secondary circuit of a pressurized water nuclear reactor, of stainless nickel-base austenitic alloy which has been subjected to a heat treatment at 980° C. or 1010° C. and whose composition by weight is: 5 to 10% of iron; 18 to 20% of chromium; more than 72% of nickel; less than 0.05% of carbon; less than 1% of manganese; less than 0.5% of silicon; less than 0.10% of cobalt; and less than 0.5% of copper.

6. Structural part according to claim 5, wherein the chromium content is at least 18.5% and is lower than 19.5% by weight.

7. Structural part for use in contact with the primary coolant of a presurized water nuclear reactor, of stainless austenitic nickel base alloy which has been subjected to a homogenization and hardening heat treatment recommended for X750 alloys comprising homogenization at 1093° C. for one hour and subsequent hardening at 704° C. for 20 hours containing, by weight, 5% to 9% of iron, from 18% to 20% of chromium, more than 60% of nickel, up to 1% manganese, and amounts of titanium, aluminum and niobium sufficient to increase the resilient stress limit of the structural part.

8. Structural part according to claim 7, wherein said alloy has a titanium content of from 2.25 to 2.75% by weight.

* * * * *